United States Patent [19]

Shonrock et al.

[11] E Patent Number: Re. 32,831

[45] Reissued Date of Patent: Jan. 17, 1989

[54] APPARATUS FOR SEALING A WELL CASING

[75] Inventors: Clinton O. Shonrock, Los Alamos, N. Mex.; John O. Wambaugh; Joachim A. Hoppe, both of Houston, Tex.

[73] Assignee: Schlumberger Technology Corporation, Houston, Tex.

[21] Appl. No.: 53,985

[22] Filed: Apr. 26, 1987

Related U.S. Patent Documents

Reissue of:

[64] Patent No.: 4,554,973
Issued: Nov. 26, 1985
Appl. No.: 544,658
Filed: Oct. 24, 1983

[51] Int. Cl.[4] ..... E21B 33/128

[52] U.S. Cl. ..... 166/135; 166/192; 166/196; 166/387; 277/116.4

[58] Field of Search ..... 166/135, 181, 182, 192, 166/196, 387

[56] References Cited

U.S. PATENT DOCUMENTS

| | | | |
|---|---|---|---|
| 3,067,819 | 12/1962 | Gore | 166/387 |
| 3,381,969 | 5/1968 | Crow | 277/116.2 |
| 3,463,228 | 8/1969 | Hearn | 166/181 |
| 3,529,836 | 9/1970 | Hyde | 277/116.2 |
| 3,578,078 | 5/1971 | Schillander | 166/196 |
| 3,706,342 | 12/1972 | Woolley | 166/135 |
| 4,050,517 | 9/1977 | Matthews | 166/387 |

*Primary Examiner*—Stephen J. Novosad
*Assistant Examiner*—Terry Lee Melius
*Attorney, Agent, or Firm*—Henry N. Garrana

[57] ABSTRACT

A method and apparatus for sealing a well casing, when a length of production tubing is disposed within the well casing, utilizes a sealing means having a first diameter less than the diameter of the production tubing, and the sealing means is compressible to a second diameter which sealingly conforms to the diameter of the well casing, to prevent fluids disposed in the well casing below the sealing means from flowing through the well casing to above the sealing means.

18 Claims, 6 Drawing Sheets

FIG. 1
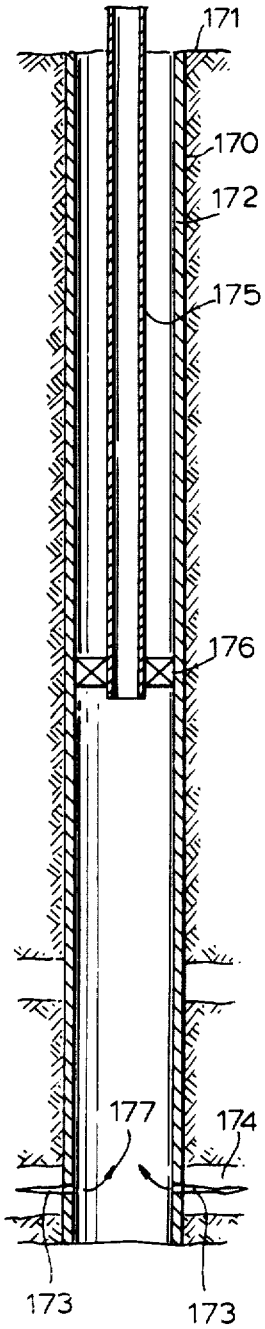
FIG. 2
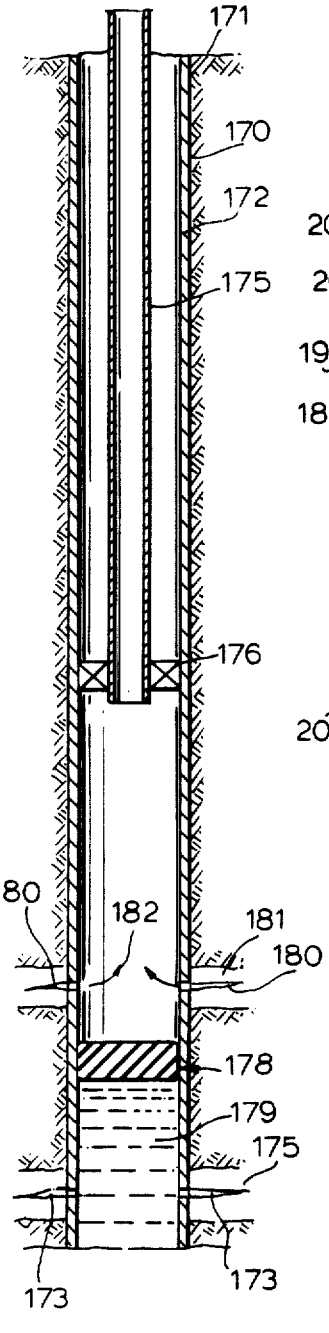
FIG. 3
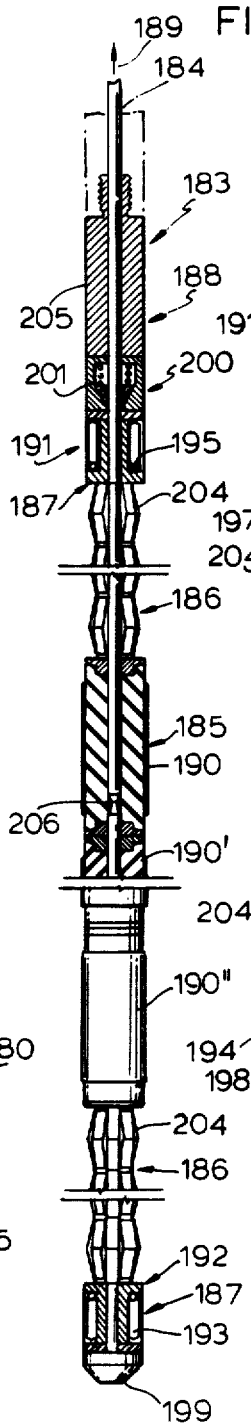
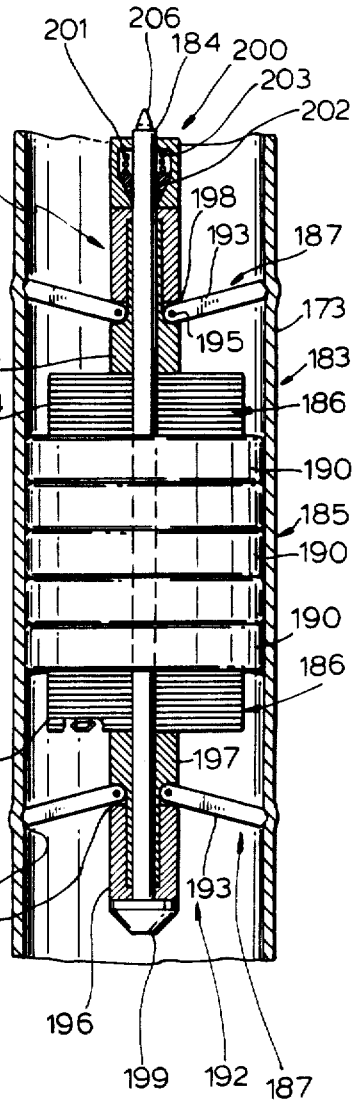
FIG. 4

FIG. 5
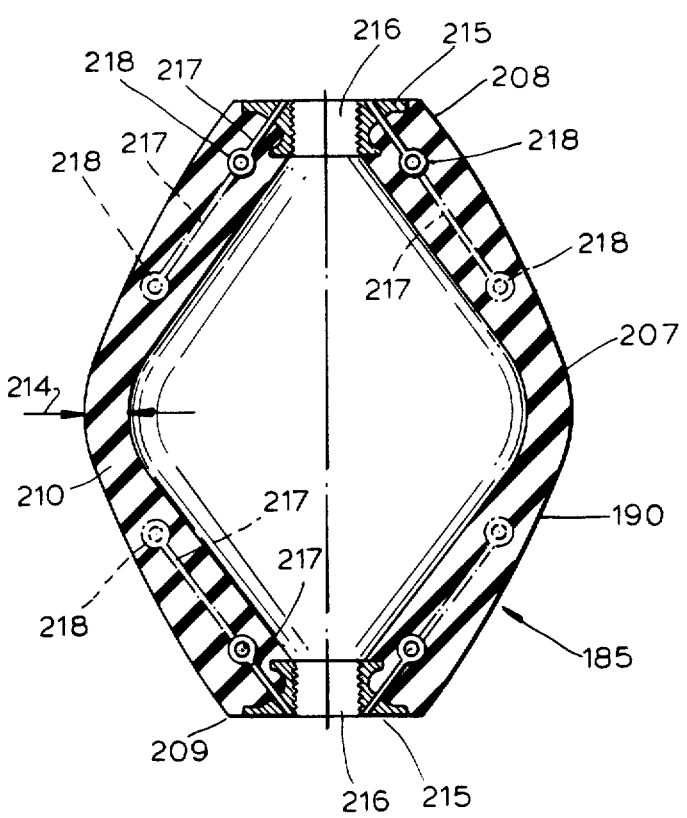
FIG. 6
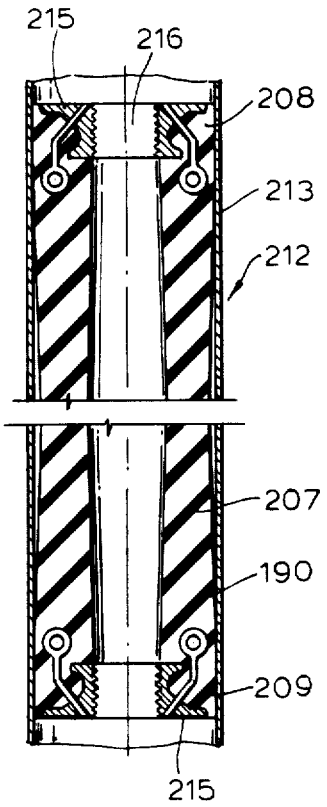
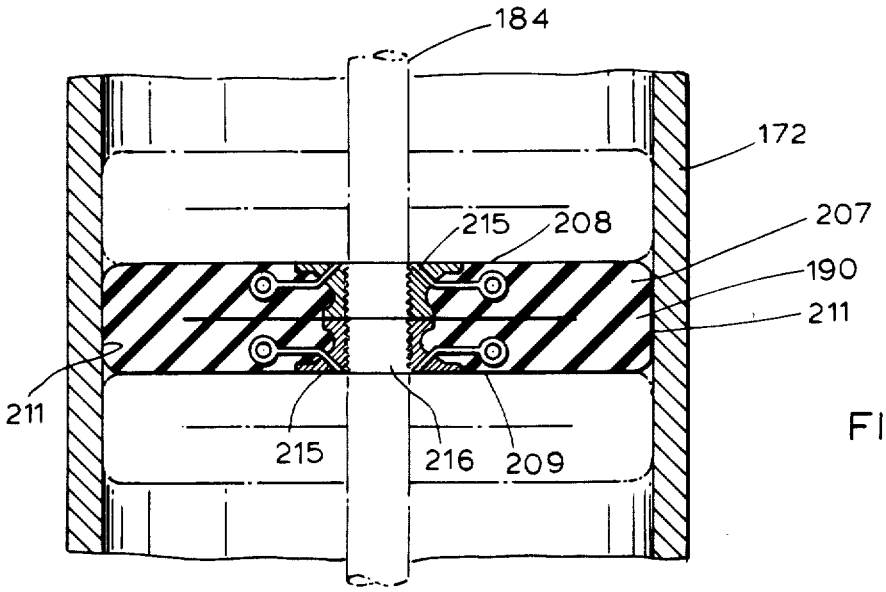
FIG. 7

FIG. 9
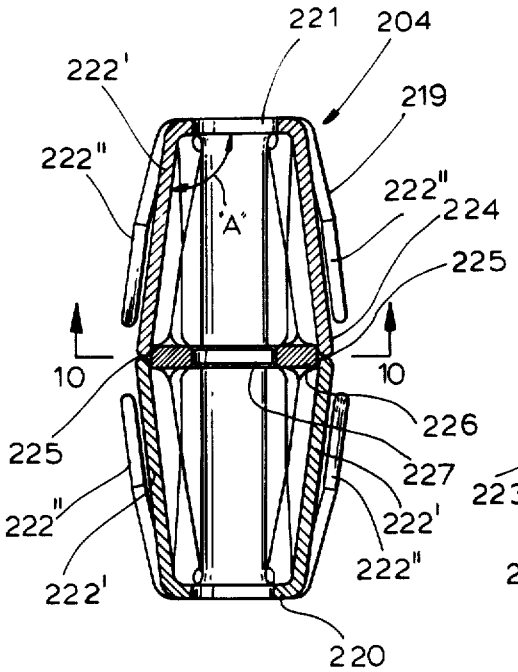
FIG. 8
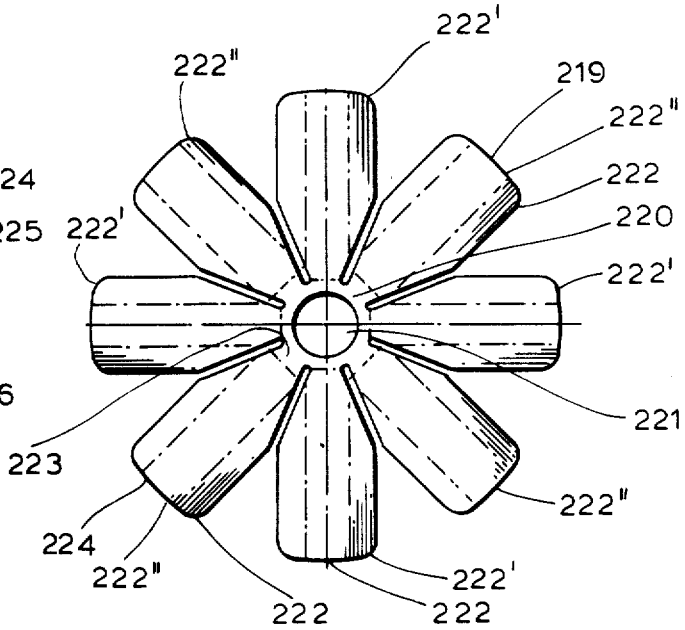
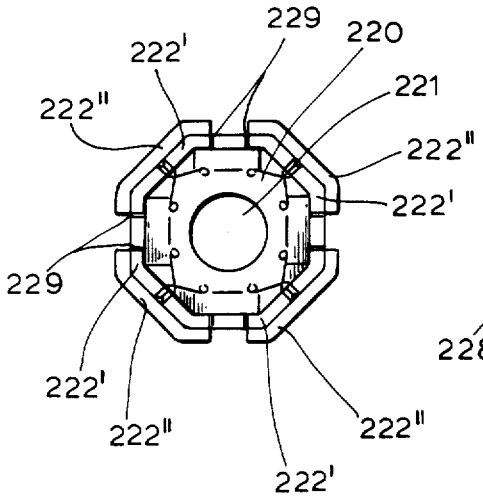
FIG. 10
FIG. 11
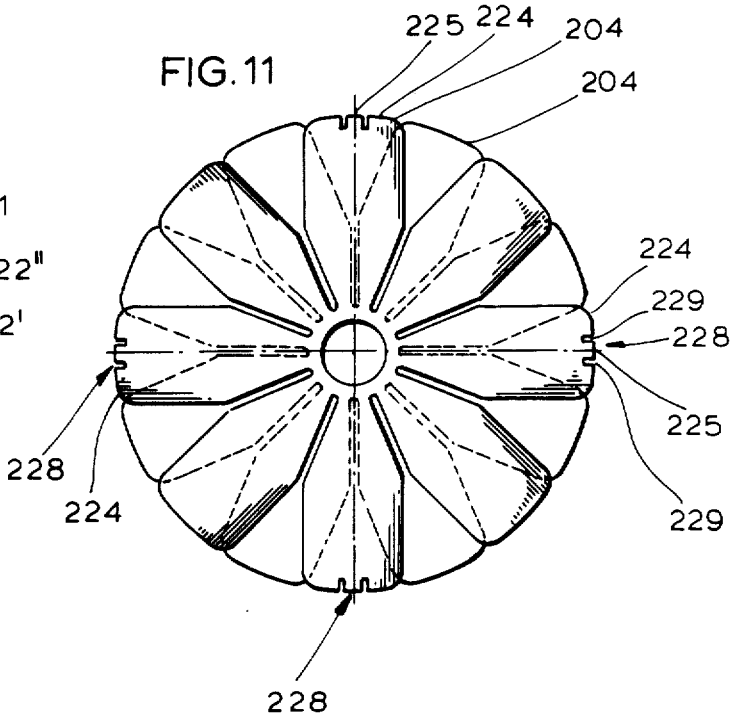

FIG. 14
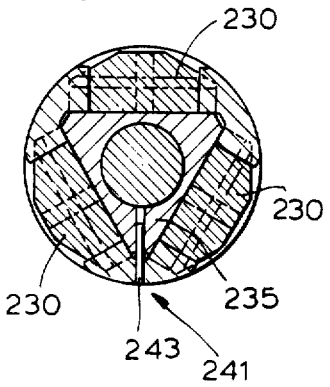
FIG.13
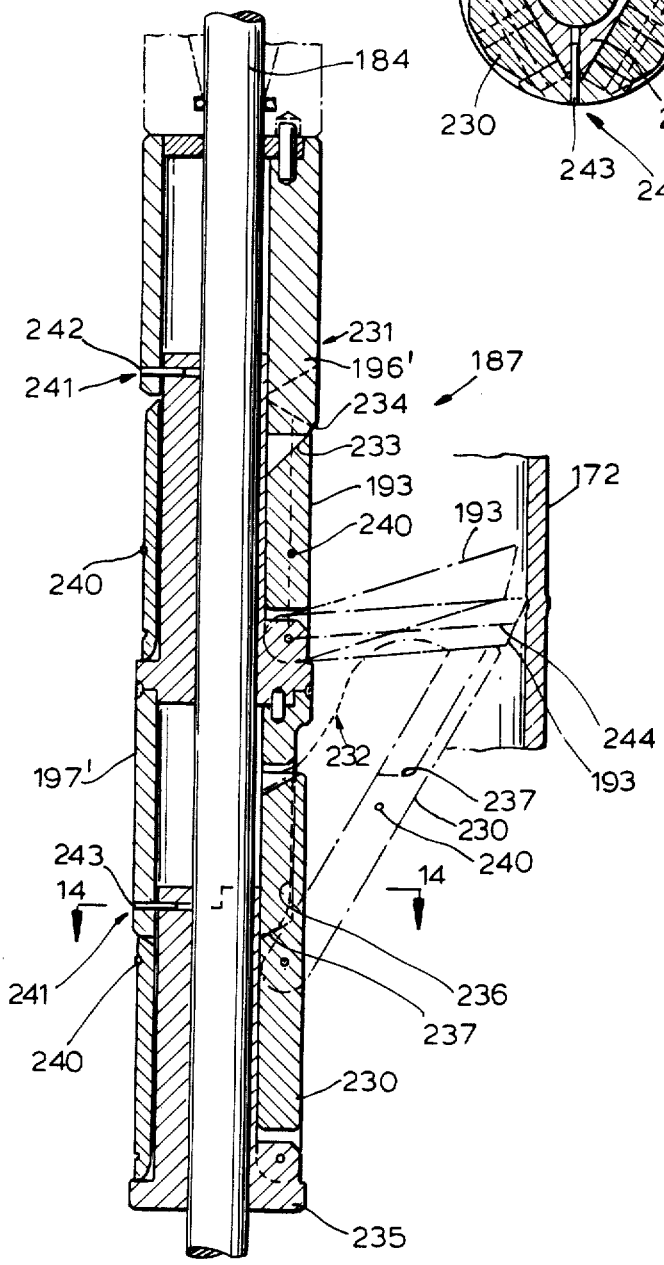
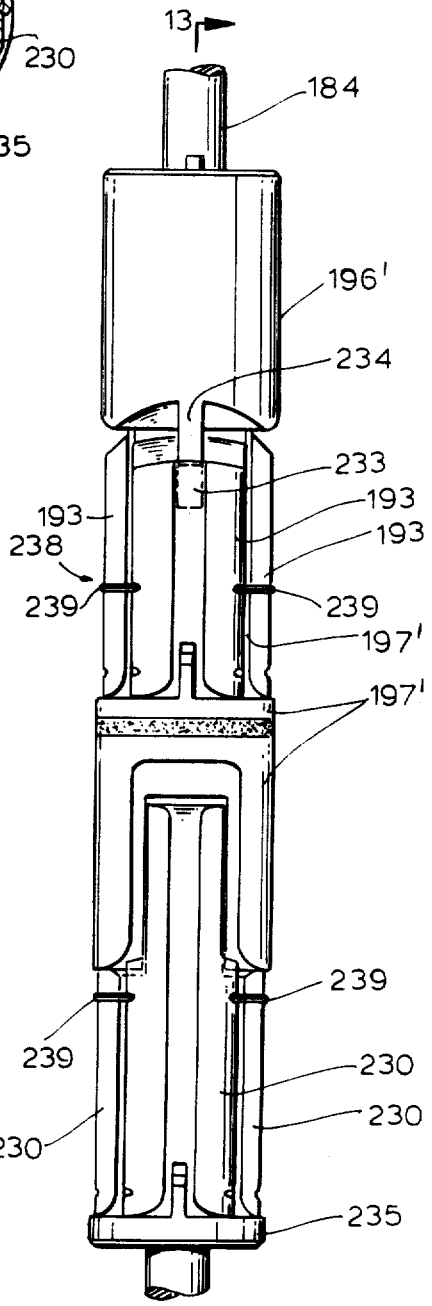
FIG. 12

APPARATUS FOR SEALING A WELL CASING

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a wireline method and apparatus for sealing a well casing having a length of smaller diameter production tubing therein, including a bridge plug, and components therefor, which is passable through the production tubing and into the well casing.

2. Description of the Prior Art

In the production of hydrocarbons, it is typical to provide a casing within the borehole and to perforate the casing along its length adjacent a particular formation which contains the hydrocarbons to be produced. Typically, production tubing is disposed within the casing and the production tubing is sealed within the casing as by a conventional packer. The hydrocarbons then flow from the producing formation through the performations in the well casing and upwardly to the surface via the production tubing.

Frequently, a particular formation, from which hydrocarbons had previously been flowing, ceases to flow the desired hydrocarbons, but rather undesired fluids, such as water, begin to flow into the casing. If another formation exists adjacent the casing, such formation being located above the first formation which is now flowing undesired fluids, the casing is sealed above the first group of perforations. Thereafter the casing is again perforated along its length adjacent the second formation from which hydrocarbon fluids are desired to be produced.

Although many devices exist which can be utilized to seal a well casing, and can be readily passed through the well casing to the desired location along the well casing, most of these devices cannot pass through conventional production tubing because of their size. Thus, in order for these conventional devices to be utilized in the previously described situation of a producing well having production tubing therein, it is necessary to remove the production tubing in order to use such devices to seal off a section of the well casing. This is a costly and time consuming operation, the cost and time increasing proportional to the depth of the well and the length of the production tubing. Furthermore, conventional devices require a work-over rig to be installed at the well site, which results in considerable delay and expense.

Two wireline suspended devices have previously been proposed to seal a well casing, such devices being capable of first passing through the production tubing disposed within the well casing. One of these devices is a collapsible metal petal basket which is lowered through the production tubing and into the well casing to the desired depth where the casing is to be sealed. At that point within the well casing, the petals of this device are caused to swing outwardly into engagement with the well casing. Gravel and/or sand are then passed through the production tubing and land on top of the metal petal basket. Thereafter, cement is poured on top of the gravel and/or sand. Upon curing of the cement, a cement plug is provided at the desired depth in the well casing. The disadvantages of utilizing this device are that it typically takes a long period of time for the cement to properly cure. Since the undesired fluids flowing in the well casing beneath the cement may be still flowing, and are frequently flowing under substantial pressure, the cement does not cure properly and/or the integrity of the seal between the cement and the well casing is not of the quality which is desired due to a high differential pressure acting upon the cement, as well as from the roughened and contaminated surface conditions of the well casing due to corrosion, sludge, paraffin, and/or carbonate. Additionally, the time required from the start of the cement plugging process until the well can be placed back into service can be excessive and often very expensive.

Another device which has been utilized to provide the desired sealing of a well casing and which can be passed through the production tubing is an inflatable rubber bladder. This bladder is placed at the desired depth where the seal is to be placed within the well casing, and the bladder is then inflated. Typically, the bladder is of thin-wall construction to facilitate its passage through the tubing and its inflation. After the bladder has been inflated, cement is poured over the bladder and the desired sealing is effected upon the cement curing. The disadvantages with this device are that because of the pressure and temperature conditions existing down-hole, as well as the roughened and contaminated surface conditions of the well casing previously described, the bladder frequently ruptures upon being inflated, or ruptures after the cement has been poured upon the bladder, but before the cement has cured. Thus, it is necessary to start over to attempt the sealing procedure. Further, some of these bladder devices have been provided with a vent tube about which the bladder is secured. This vent tube is utilized to relieve pressure from below the bladder until such time as the cement has sufficiently cured. After the cement has cured, the vent tube is then sealed off. Frequently, the diameter of the vent tube is not large enough to supply the necessary pressure relief, whereby the rubber bladder frequently bursts due to the excessive pressure build-up exerted upon the rubber bladder.

Accordingly, prior to the development of the present invention, there has been no method and/or apparatus for sealing a well casing, which: is first passable through production tubing to the desired depth in the well casing; is not subject to damage during installation; is not dependent upon cement which must be cured in order to provide the desired sealing; provides 100% seal integrity; can withstand high temperature and pressure conditions; is economical to manufacture and use; and quickly provides the desired sealing. Therefore, the art has sought a method and apparatus for sealing a well casing which is: passable through production tubing; does not require the use of cement; provides high quality seal integrity; is efficient to manufacture and use; does not require excessive time to provide the desired sealing; can withstand high pressure and temperature conditions; and is not readily subject to damage while being utilized.

SUMMARY OF THE INVENTION

In accordance with the invention, the foregoing advantages have been achieved through the present method and apparatus for sealing a well casing. The elastomeric sealing element of the present invention for a bridge plug for use within a well casing and production tubing includes: a generally tubular-shaped elastomeric member having first and second ends and a wall portion therebetween; the elastomeric member having a normal, unstressed configuration, wherein the diameter thereof varies along the longitudinal axis of the elastomeric member, with the diameter intermediate the ends of the elastomeric member being larger than the diameter at the ends of the elastomeric member; the elastomeric member being elongatable along its longitudinal axis whereby the diameter intermediate the ends of the elastomeric member is substantially the same as the diameter of its ends so that the elastomeric member may pass through the production tubing; and the elastomeric member being compressible along its longitudinal axis whereby the ends of the elastomeric member can be forced toward one another while a portion of the wall portion sealingly conforms to the well casing. *The new and improved apparatus of the present invention further includes a through-tubing bridge plug having a plurality of the elastomeric members of the invention mounted around a tool body between upper and lower sets of opposed support members movably mounted on the tool body above and below the elastomeric members with each of these support members having a plurality of petal-like projection that are adapted to be swung outwardly away from the tool body to laterally-extended positions where their opposed faces will be cooperatively coengaged for supporting the upper and lower portions of the elastomeric members against further longitudinal movement in the well casing. The through-tubing bridge plug of the present invention further includes upper and lower extendible anchor members which are cooperatively arranged on the tool body above and below the upper and lower support members for moving into anchoring engagement with the wall of the well casing after the elastomeric members have been expanded outwardly into sealing engagement therewith.*

The method of the present invention for sealing off a length of well casing to prevent fluid disposed therein from flowing upwardly into another length of well casing, the well casing having a length of production tubing therein includes the steps of: disposing about an elongate mandrel a generally tubular-shaped, elastomeric sealing element having first and second ends and a wall portion therebetween, the elastomeric sealing element having a normal, unstressed configuration wherein the diameter thereof varies along the longitudinal axis of the elastomeric sealing element, with the diameter intermediate the ends of the elastomeric sealing element being larger than the diameter at the ends of the elastomeric sealing element, and the diameter intermediate the ends of the elastomeric sealing element being larger than the diameter of the production tubing and smaller than the diameter of the well casing; elongating the elastomeric sealing element along its longitudinal axis, and restraining the elastomeric sealing element in its elongated configuration, whereby the diameter intermediate the ends of the elastomeric sealing element is substantially the same as the diameter of its ends, and is less than the diameter of the production tubing; lowering the mandrel and elastomeric sealing element thereon downwardly through the production tubing and into the well casing; compressing the elastomeric sealing element along its longitudinal axis to break the restraining means to allow the sealing element to assume its normal, unstressed configuration; and further compressing the elastomeric sealing element along its longitudinal axis to force a portion of the wall portion of the elastomeric sealing element to sealingly conform to the well casing.

BRIEF DESCRIPTION OF THE DRAWINGS

In the drawings:

FIGS. 1 and 2 are partial cross-sectional views along the longitudinal axis of a well bore schematically illustrating the intended use of the method and apparatus in accordance with the present invention;

FIG. 3 is a partial cross-sectional view along the longitudinal axis of a bridge plug in accordance with the present invention, when it is being passed through production tubing;

FIG. 4 is a partial cross-sectional view along the longitudinal axis of a bridge plug in accordance with the present invention, when it has been placed within the well casing to seal the well casing;

FIG. 5 is a partial cross-sectional view of an elastomeric sealing element for a bridge plug in accordance with the present invention;

FIG. 6 is a partial cross-sectional view along the longitudinal axis of an elastomeric sealing element for a bridge plug in accordance with the present invention, illustrating the sealing element as it is passed through the production tubing;

FIG. 7 is a partial cross-sectional view of an elastomeric sealing element for a bridge plug in accordance with the present invention, illustrating the sealing element as it is disposed when sealing the well casing;

FIG. 8 is a plan view of a blank used to form a reinforcing element for a bridge plug, in accordance with the present invention;

FIG. 9 is a partial cross-sectional view along the longitudinal axis of a reinforcing element for a bridge plug in accordance with the present invention, shown in its configuration for passing through production tubing;

FIG. 10 is a cross-sectional view taken along line 10—10 of FIG. 9;

FIG. 11 is a plan view illustrating two reinforcing elements for a bridge plug in accordance with the present invention, illustrating two superimposed reinforcing elements in their configuration after being compressed and disposed within the well casing;

FIG. 12 is a side view of an anchoring assembly for a bridge plug in accordance with the present invention;

FIG. 13 is a partial cross-sectional view taken along line 13—13 of FIG. 12;

FIG. 14 is a partial cross-sectional view taken along line 14—14 of FIG. 13;

Figure 15:
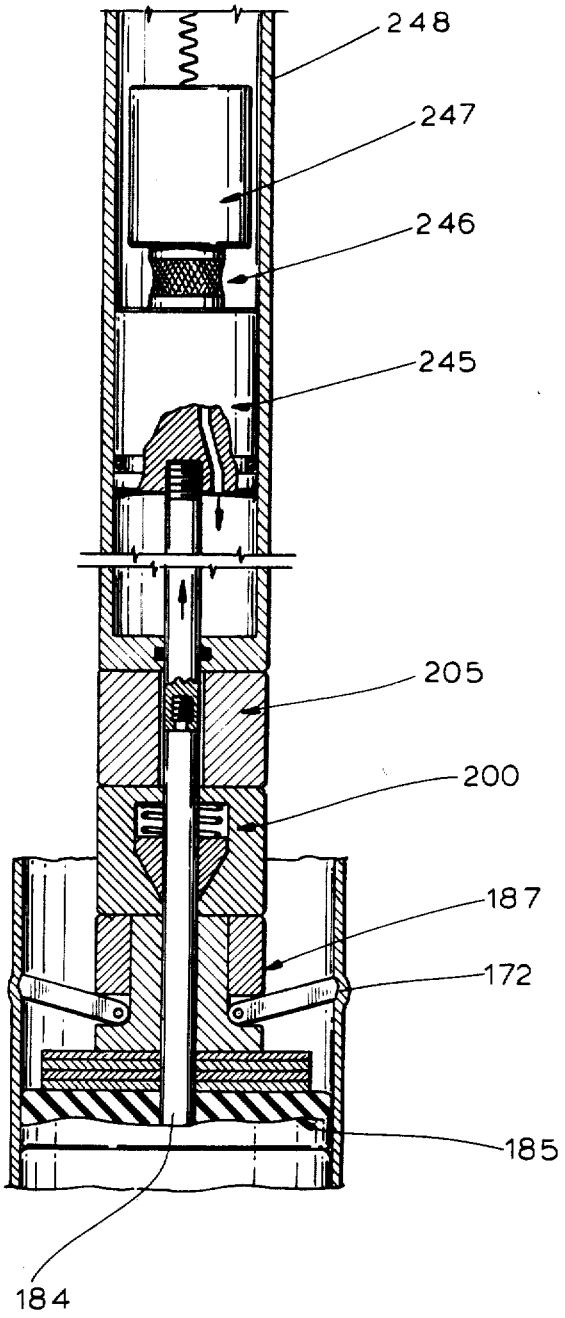
FIG. 15 is a partial cross-sectional view along the longitudinal axis of a portion of a bridge plug and its setting means in accordance with the present invention.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the claims.

DETAILED DESCRIPTION OF THE INVENTION

In FIGS. 1 and 2, a borehole 170 is disposed in the earth's surface 171, which borehole 170 has been provided with a conventional well casing 172. As shown in FIG. 1, a first set of perforations 173 have been provided in well casing 172 adjacent a hydrocarbon producing formation 174. Conventional production tubing 175, having a diameter less than the diameter of the well casing 172, is disposed within well casing 172 and is sealed about its end in a conventional manner as by a packer 176. The hydrocarbons, as illustrated by arrows 177, flow upwardly to the earth's surface 171 via production tubing 175. Upon the formation 174 producing undesired fluids, such as water, it becomes necessary to seal well casing 172 at a depth disposed above the first set of perforations 173. With reference to FIG. 2 a seal, or plug, shown schematically as 178, is disposed within well casing 172 above the first set of performations 173 adjacent formation 174, which now has water 179 and/or other undesired fluids flowing through perforations 173. After seal, or plug, 178 has been disposed within well casing 172, perforations 180 are provided in a conventional manner in well casing 172 adjacent another hydrocarbon producing formation 181, through which hydrocarbons 182 may flow upwardly through production tubing 175, as previously described. In order to most efficiently, expeditiously, and economically provide seal 178 in well casing 172, it is necessary to utilize a device capable of passing through the reduced diameter production tubing 175.

With reference to FIGS. 3 and 4, a bridge plug 183, in accordance with the present invention, for use within a well casing 172 and passable through production tubing 175, is shown. FIG. 3 generally illustrates bridge plug 183 in its configuration when it has a first diameter less than the diameter of the production tubing 175, in order to allow the bridge plug 183 to be lowered through the production tubing 175 to the desired depth within well casing 172 where the desired plug 178 is to be provided as illustrated in FIG. 2. FIG. 4 illustrates the configuration of bridge plug 183 when it has been disposed within well casing 172 and has a second diameter which sealingly conforms to the diameter of the well casing 172 in order to provide the desired seal 178.

Still with reference to FIGS. 3 and 4, bridge plug 183 generally comprises: an elongate mandrel 184; means for sealing 185 the well casing 172, which sealing means 185 is disposed about mandrel 184; a means for reinforcing 186 the sealing means 185, the reinforcing means 186 being disposed about mandrel 184 and located above and below seal means 185; means for anchoring 187 the sealing means 185 and the reinforcing means 186 within well casing 172 and a means for compressing 188 the sealing means 185 to force the sealing means 185 to expand from its first diameter illustrated in FIG. 3, which is less than the diameter of the production tubing 175, to a second diameter as illustrated in FIG. 4, whereby sealing means 185 sealingly conforms to the diameter of the well casing 172 to prevent fluids 179 (FIG. 2) disposed in the well casing 172 below the sealing means 185 from flowing through the well casing 172 to above sealing means 185. Compression means 188 preferably includes a means for moving the mandrel 184 upwardly as shown by arrow 189 in FIG. 3. Any suitable means may be utilized to pull mandrel 184 upwardly to cause the compression of sealing means 185, such as a suitable hydraulic pump, electric motor, or explosive powered device, which can cause the desired upward movement of mandrel 184. As will be hereinafter described in greater detail, a preferred means for moving mandrel 184 will be described in greater detail with reference to FIGS. 15, 16a and 16b. Preferably, bridge plug 183 is suspended within production tubing 175 and well casing 172 by a wireline (not shown).

Still with reference to FIGS. 3 and 4, the bridge plug 183 will be described in greater detail. Preferably, sealing means 185 includes at least one resilient, elastomeric sealing element 190 carried by mandrel 184. In FIG. 3, one sealing element 190 is shown in full cross-section, another sealing element 190′ is partially shown, and one sealing element 190″ is shown within a restraining means to be hereinafter described in greater detail with respect to FIG. 6. Sealing elements 190 may be made of any suitable elastomeric material and/or construction, provided the sealing elemnt 190 has the ability to be compressed to expand from its first reduced diameter, shown in FIG. 3 to expand to its second diameter, shown in FIG. 4, wherein sealing elements 190 sealingly conform to the interior surface of well casing 172. A preferred embodiment of sealing element 190 will hereinafter be described in greater detail with respect to FIGS. 5–7.

Still with reference to FIGS. 3–4, anchoring means 187 preferably includes a first and second set of anchor arms 191, 192 disposed about the mandrel 184, each set of anchor arms 191, 192 including at least two anchor arms 193 equally spaced radially and angularly about the longitudinal axis of mandrel 184. Preferably, three equally spaced anchor arms 193 are utilized in each set of anchor arms 191, 192. The first set of anchor arms 191 is shown disposed above the sealing means 185, and the second set 192 is disposed below the sealing means 185. Anchor arms 193 are pivotably mounted with respect to the mandrel 184. Each set 191, 192 of anchor arms 193 are disposed in either a first non-operating position, as shown in FIG. 3 with their longitudinal axis being substantially parallel with the longitudinal axis of the mandrel 184 to allow passage of the anchoring means 187 through the production tubing 175, or are disposed in a second operating position, as shown in FIG. 4, with the anchor arms 195 being pivoted outwardly into engagement with the well casing 172 as shown at 194 in FIG. 4.

Each anchor arm 193 may include a pivot pin 195 disposed adjacent sealing means 185, whereby the first set 191 of anchor arms 193 pivot outwardly and downwardly toward the sealing means 185, and the second set 192 of anchor arms 193 pivot outwardly and upwardly toward the sealing means 185, as shown in FIG. 4. Anchoring means 187 may include a camming member 196 (FIG. 4) which cooperates with the anchor arms 193 to cause the anchor arms 193 to pivot outwardly toward their second operating position, as shown in FIG. 4, upon compression of sealing means 185. As seen in FIG. 4, the first and second sets 191, 192 of anchor arms 193 are mounted upon an anchor arm support body 197 disposed in sliding engagement with mandrel 184. When anchor arms 193 are initially disposed in their non-operating position, camming members 196 are spaced from the ends of the anchor arms 193 which do not have the pivot pins 195 disposed therein, and camming members 196 are disposed in sliding engagement with respect to mandrel 184. Upon mandrel 184 being moved upwardly to compress sealing means 185, the ends 198 of camming members 196 cooperate with anchor arms 193 to cause them to pivot outwardly due to the relative motion between the camming members 196 and the anchor arm support bodies 197, caused by the upward movement of mandrel 184. In this regard, it should be noted that the lower end of mandrel 184 is secured to a conventional nose piece 199, whereby upon mandrel 184 being raised, nose piece 199 bears against the lower camming member 196 to force it in an upward direction.

With reference to FIG. 4, it should be noted that due to the resilient nature of elastomeric sealing elements 190, once sealing elements 190 have been compressed, as shown in FIG. 4, due to the upward movement of mandrel 184 and its associated nose piece 199, it is desirable to retain sealing means 185 in sealing conformity with the well casing 172. Accordingly, a means for retaining 200 sealing means 185 in sealing conformity with the well casing 172 may be included with compression means 188. Preferably, the means for retaining 200 comprises a mandrel lock 201 which fixedly secures the mandrel 184 with respect to the sealing means 185 after the sealing means 185 has been compressed to assume its second diameter as shown in FIG. 4. Mandrel lock 201 may be of conventional construction, wherein it includes a spring biased chuck member 202 and biasing spring 203, as shown in FIG. 4.

The reinforcing means 186 of bridge plug 183 preferably includes a plurality of reinforcing elements 204 disposed about mandrel 184, and as seen in FIG. 3, reinforcing elements 204 have a first diameter less than the diameter of the production tubing 175 to allow passage therethrough. As seen in FIG. 4, reinforcing elements 204 are compressible to a second diameter which is greater than the diameter of the production tubing 175. At least one of the reinforcing elements 204 contacts the top surface of the sealing means 185, and at least one reinforcing element 204 contacts the bottom surface of sealing means 185. Reinforcing elements 204 are provided because the compressive force exerted upon the sealing means 185 should preferably be exerted over a surface whose area approximates the expanded surface area of sealing means 185. Thus, the sealing elements 190 of sealing means 185 will be evenly compressed and sealing elements 190 will not be punctured by anchor arm support bodies 197 upon mandrel 184 being raised, which causes the compression of sealing elements 190 between the anchor arm support bodies 197. In this regard, it should be noted that bridge plug 183 may be provided with a body member, or setting sleeve, 205 (FIG. 3) through which mandrel 184 passes, which body member 205 remains substantially stationary with respect to well casing 172 as mandrel 184 is moved upwardly. Reinforcing elements 204 may be made of any suitable material, such as an elastomeric and/or metallic material and have any suitable construction provided that it can have a first diameter less than the diameter of the production tubing 175, and is compressible to a second diameter which is greater than the diameter of the production tubing 175. A preferred embodiment of reinforcing element 204 will be hereinafter described in greater detail with reference to FIGS. 8–11.

The method for using bridge plug 183 for sealing off a length of well casing 172 to prevent fluid disposed therein from flowing upwardly, or downwardly, into another length of well casing 172, when the well casing 172 has a length of production tubing 175 disposed therein, may comprise the following steps. Sealing means 185 is first disposed about mandrel 184 as previously described. Mandrel 184 and sealing means 185 are lowered downwardly through the production tubing 175 and into well casing 172, while the sealing means 185 has its first diameter as illustrated in FIG. 3. Sealing means 185 may then be compressed as previously described to force the sealing means 185 to assume its second diameter, as illustrated in FIG. 4, to sealingly conform to the diameter of the well casing 172. Sealing means 185 may then be anchored within the well casing by utilizing anchoring means 187 as previously described in connection with FIG. 4. It should be noted that after mandrel 184 has been locked by mandrel lock 201 to retain the sealing means 185 in sealing conformity with the well casing 172, mandrel 184 may be separated at a point disposed above the mandrel lock 201 after the mandrel 184 has been pulled upwardly to compress sealing means 185. As seen in FIG. 3, a mandrel release point 206 is disposed on mandrel 184 and is initially located beneath mandrel lock 201. Upon mandrel 184 being raised to the position shown in FIG. 4, mandrel release point 206 is disposed above mandrel lock 201. After sealing means 185 has been anchored within well casing 172, mandrel 184 may be separated at the mandrel release point 206 and the auxiliary equipment for bridge plug 183, to be hereinafter described in greater detail with respect to FIG. 15, may be raised and removed through production tubing 175 to the earth's surface 171. Production of hydrocarbons may once again be initiated as previously described in connection with FIG. 2.

Turning now to FIGS. 5–7, a preferred embodiment of sealing element 190 in accordance with the present invention is shown. Elastomeric sealing element 190 generally comprises a generally tubular-shaped elastomeric member 207 having first and second ends 208, 209 and a wall portion 210 therebetween. As shown in FIG. 5, elastomeric member 207 has a normal, unstressed configuration wherein the diameter of elastomeric member 207 varies along the longitudinal axis of the elastomeric member 207. The diameter intermediate the ends 208, 209 of the elastomeric member 207 is larger than the diameter at the ends 208, 209. When in the normal, unstressed configuration of FIG. 5, the diameter intermediate the ends 208, 209 is larger than the diameter of the production tubing 175 (FIG. 1), and is smaller than the diameter of the well casing 172 (FIG. 1). As shown in FIG. 6, elastomeric member 207 is elongatable along its longitudinal axis, whereby its diameter intermediate the ends 208, 209 is substantially the same as the diameter of its ends 208, 209 so that elastomeric member 207, after being elongated, may pass through the production tubing 175. As shown in FIG. 7, elastomeric member 207 is compressible along its longitudinal axis whereby the ends 208, 209 of elastomeric member 207 can be forced toward one another, and preferably contacting one another, while a portion 211 of the wall portion 210 sealingly conforms to the interior surface of well casing 172 upon elastomeric member 207 of sealing means 185 being compressed along the longitudinal axis of mandrel 184.

With reference to FIG. 6, sealing element 190 may include a means for restraining 212 the elastomeric member 207 in its elongated configuration, whereby the diameter intermediate the ends 208, 209 of the elastomeric member 207 is substantially the same as the diameter of its ends 208, 209. Preferably, restraining means 212 is a frangible, thin-walled tubular member 213, which upon compressive force being exerted upon the elastomeric member 207 along the longitudinal axis of elastomeric member 207, the tubular member 213 breaks and allows elastomeric member 207 to assume its normal, unstressed configuration shown in FIG. 5. Tubular member 213 may be formed of a suitable cloth material or of a thin metallic material, which material has the requisite properties to withstand utilization under the temperature and pressure conditions found in well casing 172 and the ability to break away from elastomeric member 207 upon compression thereof. Further, as seen in FIG. 5, wall portion 210 intermediate the ends 208, 209 of elastomeric member 207 may have a reduced wall thickness, as shown by arrows 214, intermediate the ends 208, 209 of wall portion 210.

Still with reference to FIGS. 5–7 it is seen that each of the ends 208, 209 of elastomeric member 207 has disposed therein a metallic flanged insert member 215, and each insert member has an axial passageway 216 therethrough coextensive with the longitudinal axis of the elastomeric member 207 and adapted to receive elongate mandrel 184 therethrough, as seen in FIG. 7. As seen in FIG. 5, each insert member 215 may include a plurality of radially spaced anchor wires 217 extending from the insert member 215 into the wall portion 210 of the elastomeric member 207. At least some of anchor wires 217, and preferably all of the anchor wires 217, have an eyelet 218, or other bond enhancing structure, disposed at their ends which are disposed within elastomeric member 207. Each eyelet 218 is seen to lie in a plane which is substantially parallel with the longitudinal axis of the elastomeric member 207 as shown in FIG. 5. Anchor wires 217 serve the purpose of insuring that insert members 215 remain secured to the elastomeric member 207.

In utilizing the sealing element 190 illustrated in FIGS. 5–6, to seal off a length of well casing 172 to provide the desired seal 178, previously described in connection with FIG. 2, the following method steps are followed. A generally tubular-shaped, elastomeric member 207 having first and second ends 208, 209 and wall portion 210 therebetween is disposed about an elongate mandrel 184. The elastomeric member 207 has a normal-unstressed configuration as previously described in connection with FIG. 5. The elastomeric member 207 is then elongated along its longitudinal axis and is restrained in its elongated configuration as previously described in connection with FIG. 6. The mandrel 184 and the elastomeric sealing element 190 disposed upon mandrel 184 is then lowered downwardly through the production tubing 175 and into the well casing 172 to the desired depth where seal 178 (FIG. 2) is described. Elastomeric sealing element 190 is then compressed along its longitudinal axis to break the restraining means 212 to allow the sealing element 190 to assume its normal-unstressed configuration of FIG. 5. Elastomeric sealing element 190 is then further compressed along its longitudinal axis to force a portion 211 of the wall portion 210 of the elastomeric sealing element 190 to sealingly conform to the well casing 172, as previously described in connection with FIG. 7.

Turning now to FIGS. 8–11, a preferred embodiment of a reinforcing element 204, previously described in connection with FIGS. 3 and 4 is shown. Reinforcing element 204 for the elastomeric sealing element 190 of sealing means 185 (FIGS. 3–4) generally comprises two metallic plate members 219, one of which is shown in FIG. 8, with each plate member 219 having a center portion 220 with an axial passageway 221 extending therethrough and adapted for receipt of elongate mandrel 184 (FIG. 4). A plurality of radially extending projections 222 having first and second ends 223, 224, extend outwardly from center portion 220 with the first ends 223 of radial projections 222 being preferably formed integral with the center portion 220, as seen in FIG. 8. As shown in FIG. 9, each of the radial projections 222 is bent downwardly to dispose the projections 222 in a plane which is substantially perpendicular to the center portion 220 of plate members 219. As seen in FIG. 9, radial projections 222 are not bent downwardly to be exactly perpendicular with center portion 220; however, are illustrated in FIG. 9 to be bent downwardly to form an angle, as shown by arrow "A" of approximately 100°. It should be understood that the angle illustrated by arrow "A" in FIG. 9 could vary from approximately 90° to 135°, dependent upon the length of radial projections 222 and the size of center portion 220. Preferably, the angle illustrated by arrow "A" is within a range of 97° to 100°.

Still with reference to FIG. 9, it is seen that at least two of the second ends 244 of two of the radial projections 222 are fixedly secured to one another as at 225, whereby the two fixedly secured plate members 219 form an elongate body which can pass through production tubing 175. Upon exertion of a compressive force on the center portions 220 of plate members 219, the radial projections 222 are then once again disposed in a plane substantially parallel to the center portions 220 of each plate member 219 appear as shown in FIG. 8, whereby the plate members 219 would be superimposed upon one another.

Preferably, as shown in FIG. 8, each plate member 219 has eight radial projections 222, and upon bending the radial projections downwardly, four of the radial projections 222 would have their second ends 224 joined to one another as shown at 225 in FIG. 9. The second ends 224 may be fixedly secured to one another as by a spot welded at 225 or any other suitable connection. In order to facilitate the fabrication and joining of the second ends 224 of the two plate members 219, a spacer member 226 may be disposed adjacent the second ends 224 of the radial projections 222 of each plate member 219 as shown in FIG. 9. Spacer member 226 is provided with an axial passageway 227 through which the mandrel 184 may slideably pass therethrough. As seen in FIG. 11, two reinforcing elements 204 are illustrated in their compressed configuration with one of the reinforcing elements 204, including its two superimposed plate members 219, being disposed over a second reinforcing element 204, which also includes its two superimposed plate members 219. The top reinforcing element 204 illustrate the use of a weld relief means 228 provided on the second ends 224 of the four radial projections 222 which were previously fixedly secured as by a spot weld at 225 (FIG. 9). Weld relief means 228 may preferably be a slot 229 formed in the second end 224 of radial projection 222, a slot 229 being disposed on both sides of the spot weld 225.

With reference to FIGS. 8, 9 and 10, a preferred method of fabricating reinforcing element 224 is illustrated. The plate members 219, with an even number of radial projections 222 extending from the center portion 220 of plate member 219, have a first set of alternating projections 222' bent downwardly and disposed in a plane which is substantially perpendicular to the center portion 220 of plate member 219. A second set of the remaining alternating projections 222' are then bent downwardly and also disposed in a plane which is substantially perpendicular to the center portion 220 of plate member 219. The second set of projections 222'' are disposed in an overlying relationship with the first set of projections 222' as shown in FIGS. 9 and 10. The second ends 224 of the first set of alternating projections 222' are then fixedly secured to one another as by spot weld 225 as shown in FIG. 9. The weld relief slots 229 are provided in the second ends 224 of the first set of alternating projections 222' as shown in FIG. 10. Accordingly, upon the compression of the reinforcing element 204 of FIG. 9, reinforcing element 204 assumes the configuration illustrated in FIGS. 8 and 11, as is also previously described in connection with FIG. 4.

With reference to FIGS. 12–14, another embodiment of the anchor means 187 described in connection with FIGS. 3–4 is shown. Anchor means, or anchor assembly, 186 generally comprises elongate mandrel 184; a set of elongate, pivotable primary anchor arms 193 and a set of elongate, pivotable anchor support members 230; each set of primary anchor arms 193 and anchor support members 230 being disposed about mandrel 184. As shown in FIG. 13 in solid lines, the sets of primary anchor arms 193 and anchor support members 230 are initially disposed in a first non-operating position with their longitudinal axis being substantially parallel with the longitudinal axis of mandrel 184 for passage through the production tubing 175 (FIG. 2) and as previously described in connection with FIG. 3. Anchoring assembly 187 further includes means for pivoting 231 the sets of anchor arms 193 and anchor support members 230 outwardly into a second operating position (illustrated in dotted lines in FIG. 13) with the set of anchor arms 193 in engagement with the well casing 172 upon relative motion occurring between the pivoting means 231 and mandrel 184. The pivoting occurs after the sets of anchor arms 193 and anchor support members 230 have passed through the production tubing 175 and into the well casing 172, as previously described in connection with FIG. 4, and as will be hereinafter described in greater detail.

While in the second operating position, illustrated in dotted lines in FIGS. 13, the set of anchor support members 230 afford an abutment which limits the travel of the anchor arms 193 to maintain the set of anchor arms in its operating position in engagement with the well casing 172. The motion of anchor support member 230 is illustrated by dotted line 232, as will be further described in greater detail. The use of anchor support members 230 provide the primary anchor arms 193 with substantial rigidity and support, whereby anchor assembly 187 provides bridge plug 183 with appreciable pressure differential capabilities when anchor arms 193 are in their second operating position in engagement with well casing 172.

It should be noted that in FIG. 13 only the first set 191 of anchor arms 193 which are disposed above the sealing means 185 as described in connection with FIGS. 3 and 4 are illustrated. The second set 192 of anchor arms 193, which are disposed below sealing means 185 as previously described in connection with FIGS. 3 and 4, would be of the same construction and the anchor assembly 187 having the second set 192 of anchor arms 193 and anchor support members 230 would be disposed about mandrel 184 as illustrated in FIG. 4, including the disposition of nose piece 199 at the lower end of mandrel 184.

With reference to FIGS. 12 and 13, it is seen that pivoting means 231 includes a camming member 196' whose function is similar to the camming member 196 previously described in connection with FIGS. 3 and 4. Camming member 196' is slideably mounted about mandrel 184 and cooperates with a camming surface 233 disposed on each of the anchor arms 193, whereby upon relative motion occurring between the camming member 196' and the anchor arms 193, the anchor arms 193 are pivoted outwardly into the position shown in dotted lines in FIG. 13. Preferably, camming surface 233 is formed by a ramped groove disposed in the underside of each anchor arm 193, and camming member 196' has a mating ramped, or camming, projection 234.

Preferably, the set of anchor arms 193 is disposed about an anchor arm support body 197', similar in function to the anchor arm support body 197 previously described in connection with FIGS. 3 and 4. The set of anchor support member 230 are disposed about an anchor support member body 235 which is also slideably mounted about the mandrel 184. As seen in FIG. 13, anchor arm support body 197' is disposed intermediate the camming member 196' and the anchor support member body 235. Pivoting means 231 further includes a camming surface 236 disposed on the anchor arm support body 197' which cooperates with a camming surface 237 disposed on each of the anchor support members 230. Accordingly, upon relative motion occurring between the anchor arm support body 197' and the anchor support members 230, the set of anchor support members 230 are outwardly pivoted to afford an abutment which limits the travel of the set of anchor arms 193 as shown in FIG. 13. As shown in FIG. 13. the length of the anchor arms 193 is less than the length of the anchor support members 230 to allow the anchor support members 230 to better brace and reinforce the anchor arms 193.

Still with reference to FIGS. 12–14, anchor assembly 187 may include a means for retaining 238 the set of anchor arms 193 and anchor support members 230 in their non-operating position shown in solid lines in FIG. 13 and as previously described in connection with FIG. 3. The retaining means may comprise a frangible wire 239 associated with each anchor arm 193 and anchor support member 230, the wires 239 being broken upon relative motion occurring between the pivoting means 231 and the mandrel 184. As shown in FIG. 13, each anchor arm 193 and anchor support member 230 is provided with a suitable wiring hole 240 to accept the frangible wires 239. Preferably the anchor support member body 235, the anchor arm support body 197' and the camming member 196' includes a safety means 241 for preventing accidental relative motion occurring between camming member 196' and bodies 197' and 235. Safety means 241 also assists in disposing the various components of anchor assembly 187 in its initial non-operating position illustrated in FIG. 13 and as previously described in FIG. 3. Safety means 241 prevents the anchor arms 193 and anchor support members 230 from accidentally pivoting outwardly while the anchor assembly 187 is being transported through production tubing 175 in the event of a shock force being transmitted to camming member 196' which would in turn initiate the outward pivotal motion of the anchor arms 190 and anchor support members 230. Preferably, safety means 241 comprises a first frangible connection 242 between the camming member 196' and the anchor arm support body 197', and a second frangible connection 243 between the anchor arm support body 197' and the anchor support member body 235, which frangible connections 242, 243 are broken upon a pre-determined compressive force being exerted upon the camming member 196'. The first and second frangible connections 242, 243 may each comprise a shear pin, which is sheared upon a predetermined compressive force acting upon camming member 196' which force exceeds shock forces encountered in the borehole. Thus, the anchor arms 193 and anchor support members 230 will only be pivoted outwardly when they are disposed in the well casing 172 and a sufficient compressive force has been exerted to shear the shear pins 242, 243.

It should be noted that although each set of anchor arms 193 and anchor support members 230 should include at least two anchor arms and anchor support members which are equally spaced about mandrel 184, three equally spaced anchor arms and anchor support members are preferred. It should be of course understood that any number could be utilized, as well as not all anchor arms 193 require a mating anchor support member 230, so long as at least two of the anchor arms 193 are provided with an anchor support member 230.

With reference now to FIGS. 15. 16a and 16b, means for moving mandrel 184 in the direction of arrow 189 in order to cause the compression of sealing means 185, as previously described in connection with FIGS. 3 and 4, will be described in greater detail. As seen in FIG. 15, a portion of well casing 172 is shown having sealing means 185, anchoring means 187 and mandrel locking means 200 disposed below body member, or setting sleeve, 205. Although any suitable device, as previously described, may be utilized to pull mandrel 184 upwardly, the use of a demand sensitive pressure intensifier 245 and positive displacement hydraulic pump 246, which is powered by an electric motor 247, is preferred. Due to the size constraints imposed by the diameter of the production tubing 175, it is preferable to use a pump and electric motor 246, 247 which conveniently fit within an outer setting tool housing 248, and then intensify the fluid pressure output of that pump 246. The use of the demand sensitive pressure intensifier 245 thus permits the use of a pump and electric motor which do not have an excessive power requirement to be placed therein to pull the mandrel 184 upwardly. In this regard, positive displacement hydraulic pump 246 has a maximum output fluid pressure which would normally not exert enough fluid pressure to cause mandrel 184 to be raised with sufficient force to fully compress sealing means 185 and reinforcing means 186, whereas were a different pump and electric motor to be utilized, which did have a sufficiently high maximum fluid output pressure, the use of the demand sensitive pressure intensifier 245 would not be necessary. It should be further noted that the demand sensitive pressure intensifier 245 to be hereinafter described in greater detail could also be utilized to move a mandrel 184 in some other type of down-hole tool other than the bridge plug 184 of the present invention. Further, the pressure intensifier 245 could be utilized in other types of down-hole tools wherein it is desired to cause the movement of some other component of a down-hole tool by the exertion of fluid pressure upon a portion of the down-hole tool.

Figure 16A:
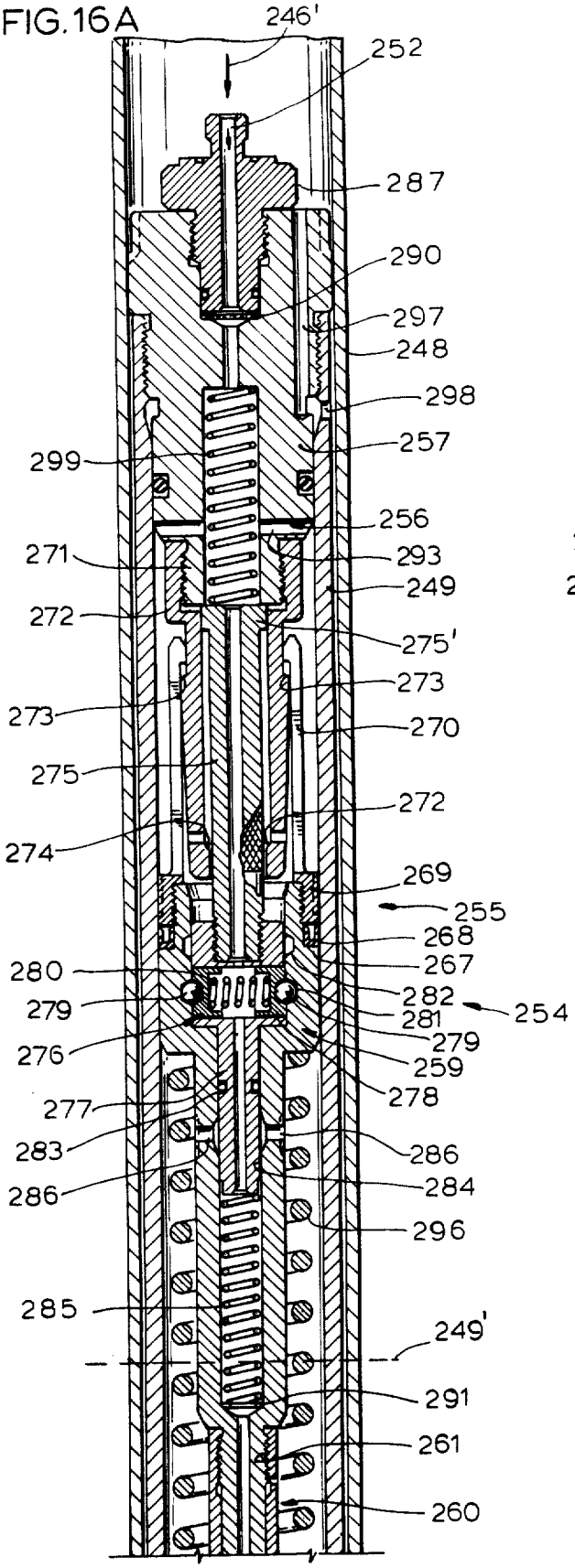
FIGS. 16a and 16b are cross-sectional views along the longitudinal axis of a pressure intensifier for a bridge plug setting tool in accordance witth the present invention.
Figure 16B:
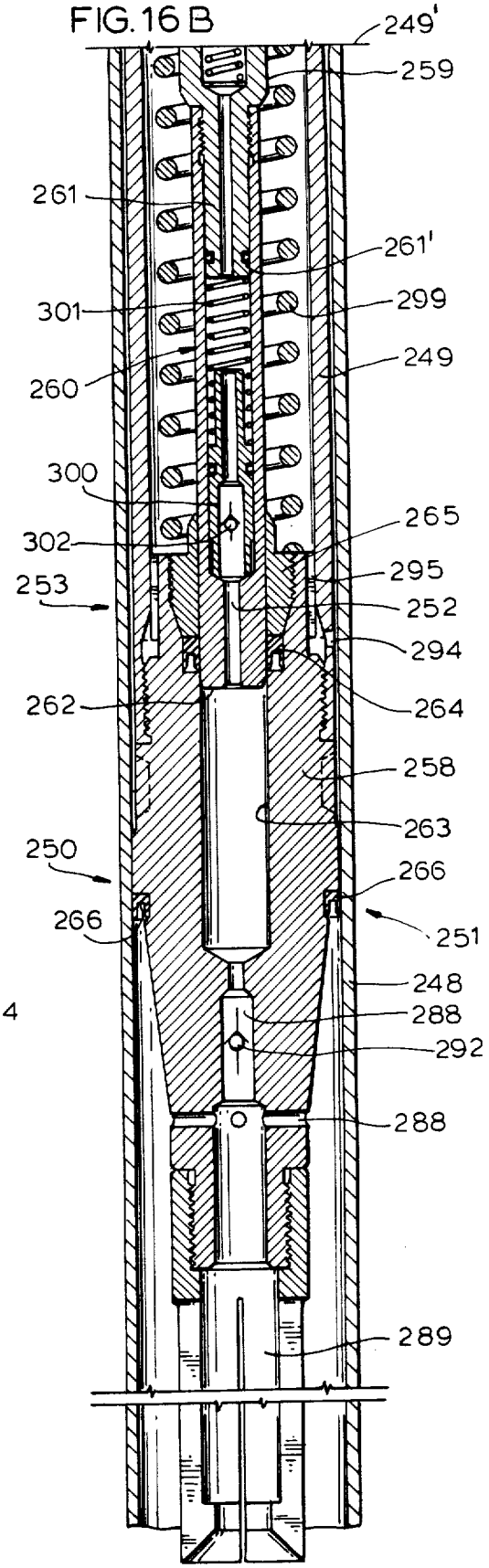

With reference to FIGS. 16a and 16b, the demand sensitive pressure intensifier 245, in accordance with the present invention is shown with its top half appearing in FIG. 16a and its lower half appearing in FIG. 16b, breakline 249' appearing in dotted lines in FIG. 16a for ease of illustration purposes. Demand sensitive pressure intensifier 245 generally comprises a housing 249 disposed within down-hole tool housing 248; a means for transmitting 250 a force associated with the housing 249 to move a portion of the down-hole tool, or mandrel 184, the force transmitting means 250 having a first fluid pressure receiving surface 251 associated with the force transmitting means 250; a first hydraulic fluid passageway 252 extending through the housing 249 and in fluid communication between the pump 246 (FIG. 15, and indicated by arrow 246' in FIG. 16a) and the first fluid pressure receiving surface 251 associated with force transmitting means 250; and means for compressing 253 hydraulic fluid disposed in the first hydraulic fluid passageway 252 to increase the fluid pressure, exerted upon the first fluid pressure receiving surface 251 associated with the force transmitting means 250, to a pressure which exceeds the maximum output pressure of pump 246. Demand sensitive pressure intensifier 245 further generally comprises a means for selectively actuating 254 the compression means 253 when the output pressure of pump 246 reaches a predetermined value below the maximum output pressure of pump 246. The selective actuation means includes a second fluid pressure receiving surface 255 associated with the selective actuation means 254, and a second hydraulic fluid passageway 256 which is in fluid communication with the pump 246 and the second fluid pressure receiving surface 255. Accordingly, upon fluid pressure acting upon the second fluid pressure receiving surface 255 associated with selective actuation means 254, reaching a predetermined value below the maximum output pressure of pump 246, the compression means 253 is actuated and fluid pressure, greater than the maximum pressure output of pump 246, selectively acts upon the first fluid pressure receiving surface 251 of force transmitting means 250.

Still with reference to FIGS. 16a and 16b, the pressure intensifier 245 will be described in greater detail. Disposed at the upper end of housing 249 is an upper intensifier head 256 and a lower intensifier head 258 is disposed at the lower end of housing 249, both heads 257, 258 being fixedly secured to, and forming a part of housing 249. Disposed between the upper and lower intensifier heads 257 and 258 is a piston assembly comprised of a carrier piston 259 and a lower piston 260 carried upon the lower, or second, end 261 of carrier piston 259 in sliding and sealing engagement therewith. In this regard the second end 261 of carrier piston 259 is provided with an O-ring seal 261' as shown in FIG. 16b. The second or lower end 262 of lower piston 260 is in sliding and sealing engagement with hydraulic cylinder 263 formed within lower intensifier head 258. The second end 262 of lower piston 260 is sealed with respect to cylinder 263 by seal 264 which is secured in sealing engagement with lower intensifier head 258 by bushing 265. The first fluid pressure receiving surface 251 is comprised of seal 266 disposed adjacent the outer surface of lower intensifier head 258 in sealing engagement with down-hole tool housing 248.

With reference to FIG. 16a, it is seen that the first, or upper end, 267 of carrier piston 259 has a seal 268 disposed about it in a sealing relationship with the intensifier housing 249. Seal 268 comprises the second fluid pressure receiving surface 255 as will be hereinafter described in greater detail. Also mounted about the upper end 267 of carrier piston 259 is a collet member 269 having at least two collet fingers 270 extending therefrom. Upper intensifier head 257 has a depending projection 271 from which is suspended and fixedly secured thereto, an elongate alignment stop member 272 which is releasably engaged by the collet fingers 270. Alignment stop member 272 is provided with: a raised collet finger seating surface 273 disposed on the outer surface of alignment stop member 272; and a stem stop surface 274 disposed on its inner surface. In this regard, carrier piston 259 has disposed within its upper end 267 an elongate stem 275 which has a flanged end 275' at its upper end which cooperates with stem stop surface 274 as will be further described in greater detail.

Stem 275 is fixedly secured to a releasable connection means 276, to be hereinafter described in greater detail. A poppet 277 is also fixedly secured to releasable connection means 276, and extends into carrier piston 259 as shown in FIG. 16a. Releasable connection means 276 preferably comprises a body member 278 having two spring biased balls 279 and spring 280 disposed therein, which balls 279 mate with two sets of detents 281, 282 disposed within the interior of the upper end 267 of carrier piston 259. Body member 278 is formed so as to permit hydraulic fluid flowing through stem 275 to flow through body member 278 into and through poppet 277. As shown in FIG. 16a, balls 279 are disposed in the first set of detents 281, and this position corresponds to when the selective actuation means 254 of compression means 253 has not been actuated, as will be hereinafter described in greater detail. Poppet 277 is provided with a seal 283 on its outer surface which sealingly engages the interior, cylindrical poppet cylinder 284 disposed within carrier piston 259. A poppet spring 285 is disposed within poppet cylinder 284, and carrier piston 259 is provided with a restroking hole or holes 286 which can be in fluid communication between poppet cylinder 284 and the interior of housing 249, as will be hereinafter described.

Upper intensifier head 257 may be provided with an adapter member 287 through which the previously pressurized hydraulic fluid from pump 246 enters into the first fluid passageway 252. In this regard, it should be noted that pressurized hydraulic fluid can initially pass from adapter member 287 and then through the upper intensifier head 257, stem 275, releasable connection 276, poppet 277, carrier piston 259, lower piston 260, fluid passageway 288 in the lower intensifier head, and then into contact with the first fluid pressure receiving surface 251, or seal 266. A fluid bulkhead (not shown) is sealingly disposed downstream of fluid passageway 288 to force the pressurized hydraulic fluid to exert a pressure force upon seal 266. A means for attaching 289 a mandrel 184 to the lower intensifier head 258 is shown in FIG. 16b, whereby upon fluid pressure being exerted upon first fluid pressure receiving surface 251, or seal 266, the upper and lower intensifier heads 257, 258, and the housing 249 secured thereto, travel upwardly within down-tool housing 248, whereby mandrel 184 may exert its upward force to compress the sealing means 185 as previously described in connection with FIGS. 3 and 4. If desired, first fluid passageway 252 may include a plurality of conventional filters to screen out any impurities from the hydraulic fluid. For example, a filter 290 may be disposed between adapter member 287 and the upper intensifier head 257 and a filter 291 may be disposed between poppet spring 285 and the end of the poppet cylinder 284 disposed within carrier piston 259. Lower intensifier head 258 is provided with a check valve 292 which prevents hydraulic fluid from flowing upwardly through lower intensifier head 258.

Still with reference to FIGS. 16a and 16b, the selective actuation means 254 for compression means 253 will be described in greater detail. Pressurized hydraulic fluid from pump 246 enters the second hydraulic fluid passageway 256 as it flows through upper intensifier head 257 and enters passageway 293 of second hydraulic fluid passageway 256 formed in upper intensifier head 257. Passageway 293 allows the pressurized hydraulic fluid from pump 246 to act upon the second fluid pressure receiving surface 255, or collet 269 and seal 268 disposed against the upper end 267 of carrier piston 259. It should be noted that the pressure below seal 268 of second fluid pressure receiving surface 255 is at ambient pressure due to the venting of intensifier housing 249 by opening 294 in housing 249 and spline 295 formed in lower intensifier head 258 adjacent hole 294 in housing 249. When the fluid pressure acting upon seal 268 exceeds a predetermined value, which is less than the maximum fluid pressure output of pump 246, carrier piston 259 will be moved downwardly, thus simultaneously moving collet 269 and its collet fingers 270 as well as stem 275, releasable connection means 276, poppet 277 and lower piston 260. Hydraulic fluid contained in hydraulic cylinder 263 will then be further compressed and pressurized by lower piston 260.

The fluid pressure of the hydraulic fluid is increased by a factor equal to the ratio of the area across seal 268 of the second fluid pressure receiving surface and the area across the seal 264 on the lower piston 260. The predetermined value below the maximum output pressure of pump 246, which will cause carrier piston 259 to begin its downward movement and cause collet fingers 270 to be unseated from alignment stop member 272 and pass over collet stop surface 273, is a function of the design of collet fingers 270 which collet 269 and collet fingers 270 provide a means for restraining the motion of carrier piston 259 until the fluid pressure acting on seal 268 exceeds the predetermined pressure value. The greater the clamping force of collet fingers 270 upon alignment stop member 272, the greater the predetermined fluid pressure acting upon seal 268 must be in order to allow carrier piston 259 to be moved downwardly.

When carrier piston 259 approaches the end of its downward stroke, flanged end 275' of stem 275 will engage stem stop surface 274 of alignment stop member 272. Upon further downward movement of carrier piston 259, the engagement of the flanged end 275' of stem 275 will completely stop the movement of the stem 275, poppet 277 and releasable connection means 276. As carrier piston 259 and lower piston 260 continue downwardly, balls 279 of releasable connection means 276 will be compressed inwardly and poppet spring 285 biases poppet 277 upwardly, along with releasable connection means 276 and stem 275, whereby balls 279 then enter second detents 282 in carrier piston 259. As carrier piston 259 continues its downward movement and after poppet 277 has been biased upwardly, restroking holes 286 in carrier piston 259 will be uncovered allowing pressurized hydraulic fluid to flow through restroking holes 286 and through passageway 294 in intensifier housing 249. The pressurized fluid will flow upwardly through the anular space between intensifier housing 249 and down-hole tool housing 248 and through a return fluid passageway 297 formed in upper intensifier head 257 and opening 298 in intensifier housing 249 disposed adjacent fluid passageway 297. Fluid may then flow back to a conventional hydraulic fluid reservoir associated with pump 246. The venting of this hydraulic fluid allows return spring 296, which is disposed about carrier piston 259 and lower piston 260, to force carrier piston 259 upwardly. As carrier piston 259 moves upwardly stem 275 and poppet 277, along with releasable connection means 276, are also carried upwardly. Upon flanged end 275' of stem 275 bearing upon stem spring 299 disposed within upper intensifier head 257, stem spring 299 forces the downward movement of stem 257 until balls 279 of releasable connection means 276 are compresssed and are then reseated within the first set of detents 281 within carrier piston 259. As poppet 277 moves back downwardly into carrier piston 259 poppet 277 once again seals off restroking holes 286 disposed in carrier piston 259. As carrier piston 259 finishes its upward restroking movement, collet fingers 270 once again are disposed about alignment stop member 272 in the position shown in FIG. 16a. At this point in time, pressurized hydraulic fluid may either flow direcly from pump 246 through first hydraulic fluid passageway 252 directly to seal 266; or, if the pressure acting upon seal 268 exceeds the predetermined pressure value, compression means 253 is once again selectively actuated to increase the pressure of the hydraulic fluid disposed within hydraulic cylinder 263 of lower intensifier head 258.

With reference to FIG. 16b, it is seen that lower piston 260 has disposed therein a check piston 300, check piston spring 301 and check valve 302. Check valve 302 serves to prevent hydraulic fluid, being pressurized within hydraulic cylinder 263 in lower intensifier head 258, from passing upwardly through the first hydraulic fluid passageway 252 when lower piston 260 of compression means 253 has been actuated. Check piston 300 and check piston spring 301 serve as an accumulator, whereby as carrier piston 259 and collet 269 begin their downward movement, no pressure force is being exerted upon the lower end 262 of lower piston 260.

It is to be understood that the invention is not limited to the exact details of construction, operation, exact materials, or embodiment shown and described, as obvious modifications and equivalents will be apparent to one skilled in the art. Accordingly, the invention is therefore to be limited only by the scope of the appended claims.

We claim:

1. An elastomeric sealing element for a bridge plug for use within a well casing and production tubing, the diameter of the production tubing being smaller than the diameter of the well casing, comprising:

a generally tubular-shaped elastomeric member having first and second ends and a unitary wall portion therebetween;

the elastomeric member having a normal, unstressed configuration, wherein the diameter thereof varies along the longitudinal axis of the elastomeric member, with the diameter intermediate the ends of the elastomeric member being larger than the diameter at the ends of the elastomeric member;

the elastomeric member being elongatable along its longitudinal axis whereby the diameter intermediate the ends of the elastomeric member is substantially the same as the diameter of its ends so that the elastomeric member may pass through the production tubing; and the elastomeric member being compressible along its longitudinal axis to a configuration where said ends of said elastomeric member are in contact with each other whereby said unitary wall portion sealingly conforms to the well casing.

2. The sealing element of claim 1, including a means for restraining the elastomeric member in its elongated configuration, whereby the diameter intermediate the ends of the elastomeric member is substantially the same as the diameter of its ends.

3. The sealing element of claim 1, wherein the wall portion intermediate the ends of the elastomeric member has a reduced wall thickness intermediate the ends of the wall portion.

4. The sealing element of claim 1, wherein the elastomeric member has disposed in each of its ends an insert member having an axial passageway therethrough coextensive with the longitudinal axis of the elastomeric member and adapted to receive an elongate mandrel therethrough.

5. An elastomeric sealing element for a bridge plug for use within a well caing and production tubing, the diameter of the production tubing being smaller than the diameter of the well casing, comprising:

A. a generally tubular-shaped elastomeric member having first and second ends and a wall portion therebetween, the elastomeric member having a normal, unstressed configuration, wherein the diameter thereof varies along the longitudinal axis of the elastomeric member, with the diameter intermediate the ends of the elastomeric member being larger than the diameter at the ends of the elastomeric member, the elastomeric member being elongatable along its longitudinal axis whereby the diameter intermediate the ends of the elastomeric member is substantially the same as the diameter of its ends so that the elastomeric member may pass through the production tubing, and the elastomeric member being compressible along its longitudinal axis whereby the ends of the elastomeric member can be forced toward and into close proximity with one another while a portion of the wall portion sealingly conforms to the well casing; and B. means for restraining the elastomeric member in its elongated configuration, whereby the diameter intermediate the ends of the elastomeric member is substantially the same as the diameter of its ends, the restraining means being a frangible, thin-walled tubular member, whereby upon compressive force being exerted upon the elastomeric member, the tubular member breaks and allows the elastomeric member to assume its normal unstressed configuration.

6. The sealing element of claim 5, wherein the tubular member is formed of a cloth material.

7. The sealing element of claim 5, wherein the tubular member is formed of a metallic material.

8. An elastomeric sealing element for a bridge plug for use within a well casing and production tubing, the diameter of the production tubing being smaller than the diameter of the well casing, comprising:

A. a generally tubular-shaped elastomeric member having first and second ends and a wall portion therebewteen, the elastomeric member having a normal, unstressed configuration, wherein the diameter thereof varies along the longitudinal axis of the elastomeric member, with the diameter intermediate the ends of the elastomeric member being larger than the diameter at the ends of the elastomeric member, the elastomeric member being elongatable along its longitudinal axis whereby the diameter intermediate the ends of the elastomeric member is substantially the same as the diameter of its ends so that the elastomeric member may pass through the production tubing, and the elastomeric member being compressible along its longitudinal axis whereby the ends of the elastomeric member can be forced toward and into close proximity with one another while a portion of the wall portion sealingly conforms to the well casing, and B. An insert member disposed in each end of the elastomeric member, each insert member having an axial passageway therethrough coextensive with the longitudinal axis of the elastomeric member and adapted to receive an elongate mandrel therethrough, and each insert member including a plurality of radially spaced anchor wires extending into the wall portion of the elastomeric member.

9. The sealing element of claim 8, wherein at least some of the anchor wires have an eyelet disposed at their ends disposed in the elastomeric member, each eyelet lying in a plane which is substantially parallel with the longitudinal axis of the elastomeric member.

*10. A through-tubing bridge plug adapted to be lowered through a tubing string in a cased well bore and set in an interval thereof below the lower end of the tubing string comprising:*

*an elongated body;*

*packer means including a plurality of tubular elastomeric sealing members mounted around said body and cooperatively arranged with their intermediate portions respectively having an external diameter larger than the diameter of their upper and lower end portions when said sealing members are in a normal, unstressed configuration so that their intermediate portions will be doubled over and flattened together in response to oppositely-directed forces compressing their upper and lower end portions together for expanding said intermediate portions of said sealing members outwardly into sealing engagement with a well bore casing;*

*means releasably retaining each of said sealing members on said body in an initial longitudinally-elongated configuration to temporarily reduce the diameter of said intermediate portions of said sealing members to facilitate the passage of said bridge plug through a tubing string, said retaining means being operatively arranged to release said sealing members for outward expansion of their intermediate portions into sealing engagement with a well bore casing as their upper and lower end portions are compressed together by said oppositely-directed forces;*

*reinforcing means including upper and lower sets of opposed reinforcing members on said body above and below said packer means and respectively having petal-like projections disposed around said body and normally inclined outwardly therefrom, each set of said opposed reinforcing members having their respective projections angularly aligned with one another so that as said oppositely-directed forces move said reinforcing members toward said packer means, said projections will be swung away from said body through an arc of less than 90-degrees to laterally-extended positions where their opposed faces will be coengaged against one another for supporting said end portions of said sealing members against further longitudinal movement; and*

*upper and lower anchoring means cooperatively arranged on said body above and below said reinforcing means for movement into anchoring engagement with a well bore casing after said intermediate portions of said sealing members are expanded outwardly into sealing engagement therewith.*

*11. The through-tubing bridge plug of claim 10 further including means cooperatively arranged on each of said petal-like projections for strengthening them against deflection once said projections have been swung to their said laterally-extended positions and their said opposed faces are coengaged with one another.*

*12. The through-tubing bridge plug of claim 10 wherein at least a major portion of the longitudinal edges of said petal-like projections are respectively bent over for reinforcing the intermediate portions of said projections after their opposed faces have been coengaged with one another.*

*13. A through-tubing bridge plug adapted to be lowered through a tubing string in a cased well bore and set in a selected interval thereof below the lower end of the tubing string comprising:*

*elongated body means;*

*sealing means including a plurality of tubular elastomeric packer members movably disposed on said body means with their end portions capable of abutting one another, each of said packer members being cooperatively arranged with its intermediate portion having an external diameter larger than the diameter of its end portions when said packer member is in a normal, unstressed configuration so that said intermediate portions of said packer members will be doubled over and flattened together in response to oppositely-directed longitudinal forces imposed on their end portions for extending said intermediate portions of said packer members outwardly into sealing engagement with a well bore casing;*

*means releasably retaining each of said packer members on said body in an initial longitudinally-elongated configuration to temporarily reduce the diameter of said intermediate portions of said packer members to facilitate the passage of said bridge plug through a tubing string, said retaining means being operatively arranged to release said packer members for extension of their intermediate portions into sealing engagement with a well bore casing as their end portions are compressed together by said oppositely-directed longitudinal forces;*

*means releasably retaining each of said packer members on said body in an initial longitudinally-elongated configuration and reducing the diameter of said intermediate portions of said packer members to allow said bridge plug to be lowered through a tubing string, said retaining means being releasable in response to said oppositely-directed longitudinal forces to free said packer members to enable their intermediate portions to be extended outwardly into sealing engagement with a wall bore casing as their end portions are being compressed together;*

*reinforcing means including upper and lower opposed support members movably disposed on said body means above and below said sealing means and cooperatively arranged for supporting said end portions of said outwardly-extended packer member, each of said support members including multiple flat, petal-like*

*projections uniformly spaced around said body means and initially inclined slightly outwardly therefrom, each of said opposed support members having the outer ends of their respective projections in angular alignment with one another so that in response to said oppositely-directed longitudinal forces acting on said opposed support members, said projections will be swung outwardly away from said body means through an arc of less than 90-degrees to coengage the opposed faces of the aligned projections with one another and dispose said projections against said end portions of said outwardly-extended packer members; and*

*upper and lower anchoring means cooperatively arranged on said body means above and below said reinforcing means for movement into anchoring engagement with a well bore casing after said packer members have been extended into sealing engagement therewith.*

*14. The through-tubing bridge plug of claim 13 further including means cooperatively arranged on each of said petal-like projections for strengthening them against deflection once said projections have been swung to their outward positions and their said opposed faces are coengaged with one another.*

*15. The through-tubing bridge plug of claim 13 wherein at least a major portion of the longitudinal edges of said petal-like projections are respectively bent over for reinforcing the intermediate portions of said projections after their opposed faces have been coengaged with one another.*

*16. A through-tubing bridge plug adapted to be lowered through a tubing string in a cased well bore and set in an interval thereof below the lower end of the tubing string comprising:*

*an elongated body;*

*a stack of tubular elastomeric sealing members mounted on said body with their respective end portions capable of being abutted with one another and respectively having intermediate portions with their external diameters being larger than the diameter of their end portions when said sealing members are in a normal, unstressed configuration and cooperatively arranged to be respectively doubled over and then flattened together in response to oppositely-directed forces moving said end portions together and expanding said intermediate portions of said sealing members outwardly into sealing engagement with a well bore casing;*

*retaining means releasably securing said sealing members in an elongated configuration along said body to temporarily reduce the external diameters of said intermediate portions of said sealing members to about the external diameter of their end portions so that said bridge plug may be lowered through a tubing string into a cased well bore interval, said retaining means being responsive to said oppositely-directed forces to free said said sealing members for movement of their end portions together and expansion of their intermediate portions outwardly into sealing engagement with a well bore casing as said end portions of said sealing members are flattened together;*

*upper and lower sets of opposed reinforcing members on said body above and below said sealing members and cooperatively arranged for respectively supporting the uppermost and lowermost ones of said sealing members, each of said reinforcing members including a base movably mounted on said body and a plurality of petal-like projections uniformly spaced around said base and initially inclined outwardly from said body, each set of said reinforcing members comprising two of said reinforcing members mounted so as to oppose one another with the outer ends of their projections respectively aligned with one another so that in response to said oppositely-directed longitudinal forces moving said upper and lower sets of reinforcing members against said stacked sealing members, said upper and lower reinforcing members will be respectively flattened against the end portions of said uppermost and lowermost sealing members as said projections are swung further outwardly from said body to laterally-extended positions for coengaging the opposed faces of each of said aligned projections with one another to support said expanded sealing members in sealing engagement with a well bore casing; and*

*upper and lower anchoring means mounted on said body above and below said upper and lower sets of reinforcing members and cooperatively arranged for anchoringly engaging a well bore casing upon expansion of said sealing members into sealing sealing engagement therewith.*

*17. The through-tubing bridge plug of claim 16 further including means cooperatively arranged on each of said petal-like projections for strengthening them against deflection once said projections have been swung to their laterally-extended positions and their said opposed faces are coengaged with one another.*

*18. The through-tubing bridge plug of claim 16 wherein at least a major portion of the longitudinal edges of said petal-like projections are respectively bent over for reinforcing the intermediate portions of said projections after their opposed faces have been coengaged with one another.*

* * * * *